United States Patent

[11] 3,543,951

| [72] | Inventor | Harry N. Marvin<br>Larchmont, New York |
|---|---|---|
| [21] | Appl. No. | 746,227 |
| [22] | Filed | July 19, 1968 |
| [45] | Patented | Dec. 1, 1970 |
| [73] | Assignee | Midland-Ross Corporation<br>Cleveland, Ohio<br>a corporation of Ohio |

[54] CARGO-CONTAINER STACK AND STACK REINFORCING AND LASH-DOWN APPARATUS
14 Claims, 11 Drawing Figs.

| [52] | U.S. Cl. | 214/10.5 |
|---|---|---|
| [51] | Int. Cl. | B65g 1/14 |
| [50] | Field of Search | 224/42.4;<br>214/10.5; 220/97(B), 84; 280/179; 105/369,<br>369(A), 369(U); 114/75 |

[56] References Cited
UNITED STATES PATENTS

| 2,353,017 | 7/1944 | Denton | 248/361 |
|---|---|---|---|
| 2,370,551 | 2/1945 | Liebegott et al. | 214/10.5X |
| 2,915,991 | 12/1959 | Koth et al. | 214/10.5X |
| 3,027,025 | 3/1962 | Tantlinger | 214/10.5UX |
| 3,083,670 | 4/1963 | Harlander et al. | 214/10.5X |
| 3,335,531 | 8/1967 | Grimelli et al. | 248/361X |
| 3,376,685 | 4/1968 | Maurer et al. | 108/53X |

FOREIGN PATENTS

| 276,124 | 8/1927 | Great Britain | 224/42.4 |
|---|---|---|---|

Primary Examiner—Robert G. Sheridan
Assistant Examiner—Frank E. Werner
Attorneys—W. W. Portz and I. L. Groh ABSTRACT: Rack or beam apparatus for use in stacking and lashing down a stack of cargo containers on, e.g., ship decks especially adapted to function in conjunction with the corner columns of the containers ordinarily provided. The apparatus and the columns are structurally coordinated to prevent high stack stresses imposed on individual container structure as a result of ship roll or wave action.

INVENTOR
HARRY N. MARVIN
BY
ATTORNEY

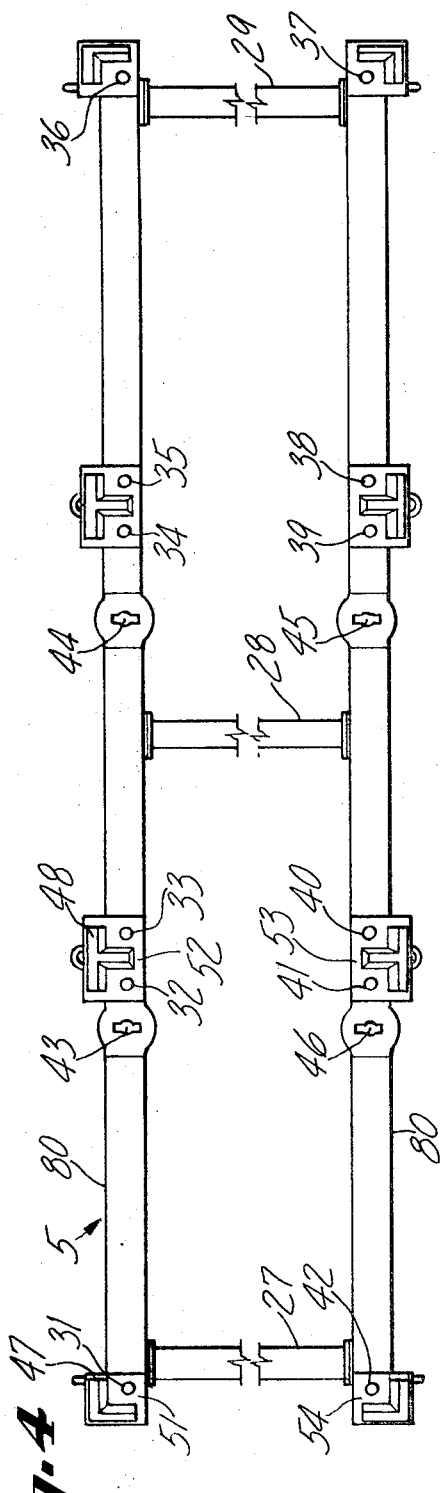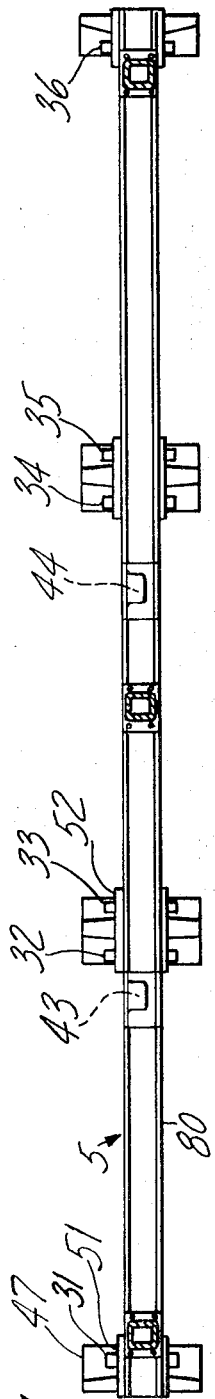

Patented Dec. 1, 1970
3,543,951
Sheet 3 of 4
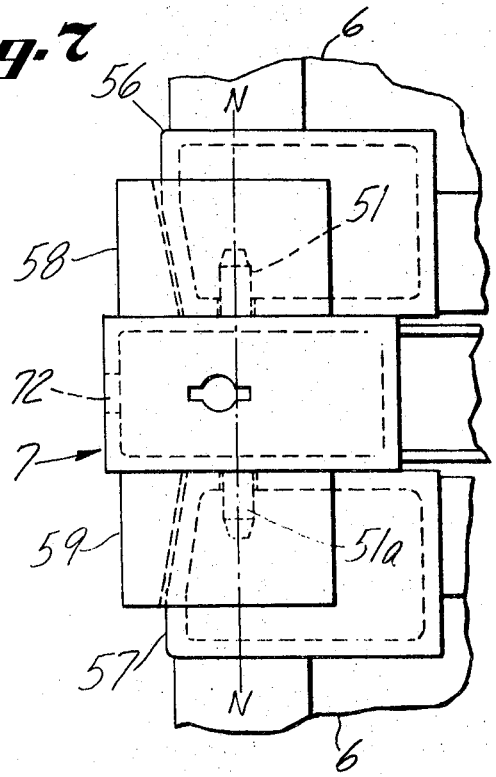
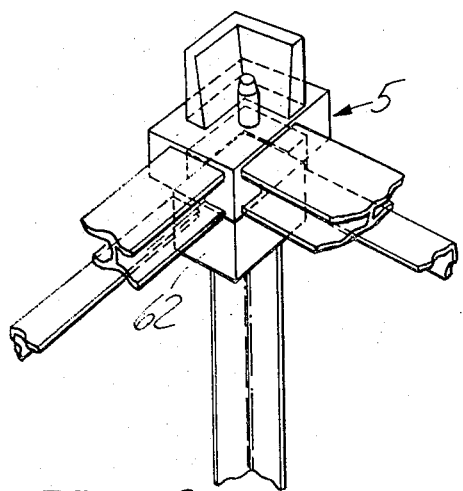
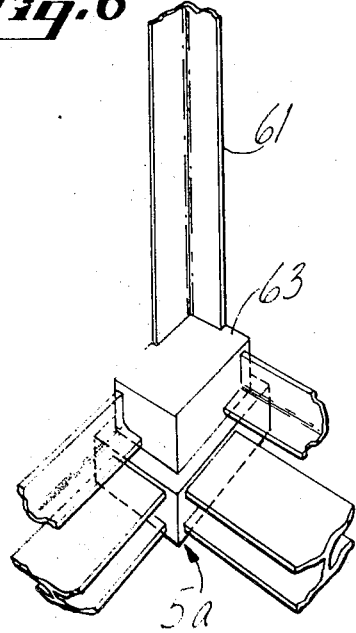
INVENTOR
HARRY N. MARVIN
BY
ATTORNEY

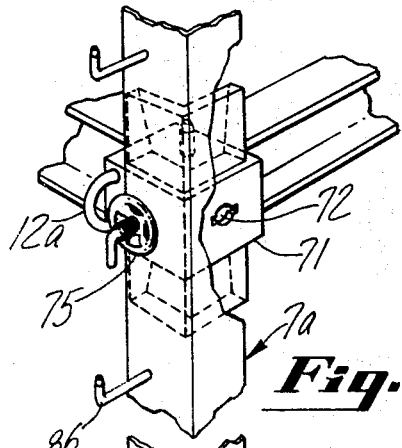
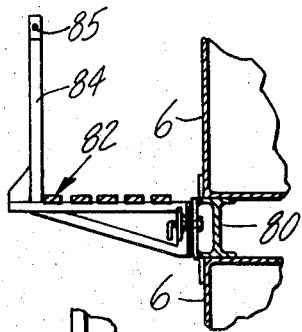
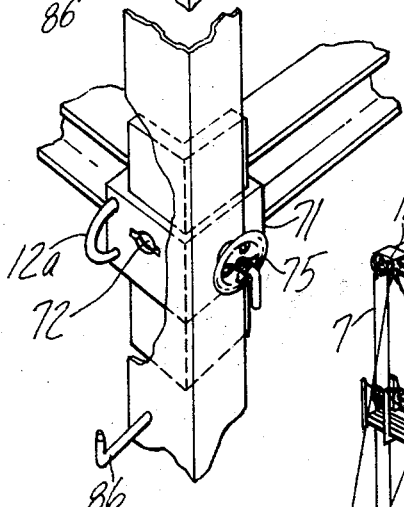
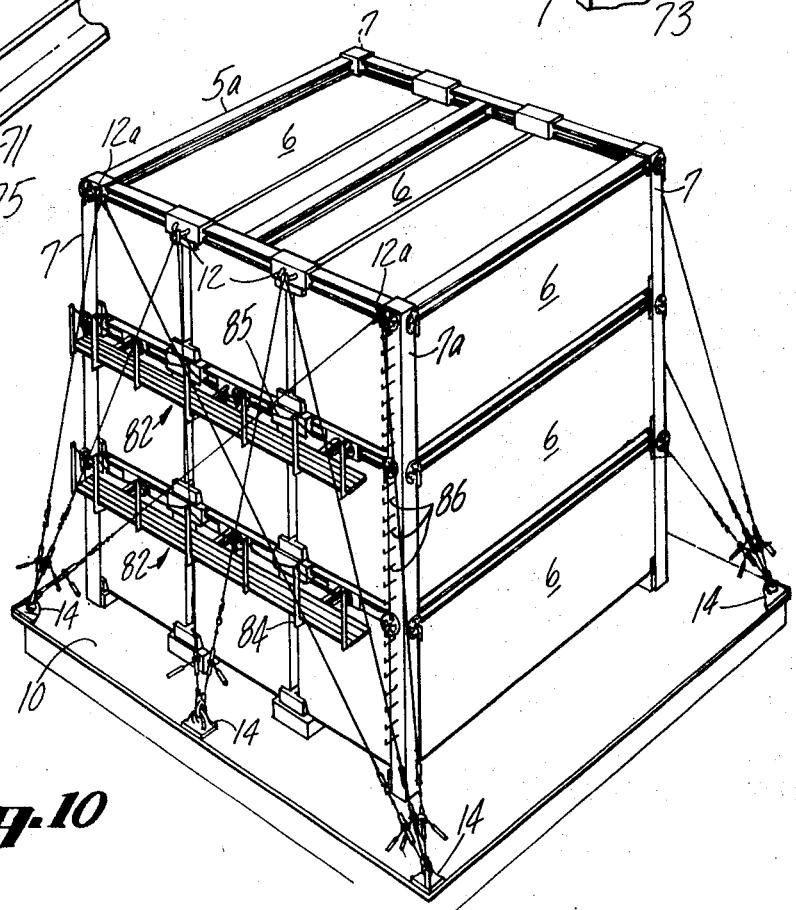

CARGO-CONTAINER STACK AND STACK REINFORCING AND LASH-DOWN APPARATUS

Currently, cargo containers are being transported on the high seas in large numbers by conventional cargo vessels. Such containers are carried to a substantial extent on such vessels above deck. It is not uncommon for the containers to be disposed above deck in stacks of three or more tiers wherein the containers are connected together both vertically and horizontally by coupling devices which tie adjacent containers together through adjacent corner castings. Such prior art coupling devices are adapted to enter the apertures of the corner castings and interlock therewith. The stack in its entirety is lashed to the deck by guy cables attached to corner castings of containers in an upper tier of the stack.

Because of this container-to-container mode of connection, it is found that any major stress applied to the stack as a whole will be sustained by at least some of the containers of the stack individually.

The frame structure of the individual containers is subjected to extreme stresses from at least two major sources. Because of the necessity to conform stacking to conventional ship structure, especially the hatch cover arrangement, the containers are usually stacked with their lengths parallel to the length of the vessel. Hence, in spite of the fact that the frames of the containers comprise corner columns of a load capacity substantially in excess of that needed to support the tiers of containers in such stacks under static conditions, destructive warping forces are generated in the containers under continuous, unrelenting, rolling action of the vessel as it cyclically passes through reversals of list.

The container framework is susceptible of damage particularly within the lighter gage horizontal frame members and especially at the joints of such members with the corner castings. In practice, slackness is always present in some degree throughout a stack because of the loose-fitting connecting hardware that must be employed and the yielding or looseness in guy cables that develops to an increasing degree as the period of the journey at sea increases. Moreover, there is the matter of care exercised in originally assembling the stack and lashing it down. For example, it is generally found that the guy cables vary considerably in tautness at the beginning of the voyage.

A further major cause of destruction is the impact of waves in heavy seas especially as the vessel lists momentarily toward the waves. In this situation, it is common for the relatively weak sidewalls of containers to collapse. Frequently, the otherwise sturdy corner columns of two vertically adjacent containers are torn loose from their lateral support. At this point superimposed containers are free to sag from their proper positions to cause slack in the guy cables and the integrity of the stack is consequently destroyed. As many as 70 containers have been known to be lost in this manner from a single ship in one port-to-port voyage.

An important object of this invention is to provide apparatus which may be incorporated into a stack of cargo containers to obtain less relative movement of the containers, to rigidify the stack as a whole, and to absorb forces acting between the stack and supporting structure therefor in the apparatus instead of transmitting such forces to the framework of individual containers.

A further object is to reduce the amount of labor and especially the former danger attendant upon climbing about the upper tiers of a stack of containers in applying the various fixtures heretofore used to connect containers and to lash down the stack.

Another object is to eliminate the variety and clutter of loose pieces of container-connecting and lashing hardware formerly used.

Still another object is to completely eliminate lateral forces on individual containers which are of cumulative nature and transferred from container to container in conventional container stacking systems.

An object ancillary to the foregoing object is to provide stack-stabilization hardware that is couplable with a container-hoisting spreader or other hoisting equipment and may be positioned in the stack by such hoisting equipment.

The above and other objects of the invention are achieved in a cargo-stacking system including beam means, which in one embodiment of the invention comprises essentially an elongate beamlike member extending in the crosswise direction of a tier of containers arranged in side-by-side relationship with each member interlocking with corner casting on all containers at one end of the tier.

In another embodiment, the invention resides in a rigid framelike rack fitting over the top of a selected number of containers within one tier with projecting means, such as vertically extending dowels or pegs which during operation extend into and interlock with corner castings at both ends of each of the containers whose tops are embraced by the rack.

Of the aforementioned beamlike members, each extends along and interlocks with the adjacent ends of a tier of containers which may be connected with its counterpart at the other end of the tier by any type of tensile element of appropriate strength. The beam means occurring in either one of the two embodiments in conjunction with tie means, the corner castings, and the corner columns of containers may be viewed as a three-dimensional latticework or framework within which the other components of the containers and the lading contained in the containers is supported in a stack stabilized as to all lateral forces acting on it.

In the drawing in respect to which the invention is described:

FIG. 4 is a plan view of a rack, such as those shown in FIG. 1;

FIG. 5 is a side elevation of the racks shown in FIG. 4;

FIG. 6 is a fragmentary perspective vertically shortened view of portions of two racks and corner frame structure of a container received between the two racks;

FIG. 7 is a fragmentary side elevation of a corner portion of a rack in place between corner portions of vertically adjacent containers;

FIG. 8 is a fragmentary vertically shortened perspective view with portions broken away showing corner portions of vertically spaced racks attached to and connected by a vertically elongate corner stay member;

FIG. 9 is an elevation in section of a rack, a stay member, such as shown in FIG. 8, and mechanism for securing the two together;

FIG. 10 is a perpsective view of a stack of containers and stabilizing apparatus interlaced therewith including walks attached to between-tier racks; and FIG. 11 is a fragmentary elevation in section showing attachment of a walk to a rack as employed in FIG. 10.

Figures 1, 2, 3:
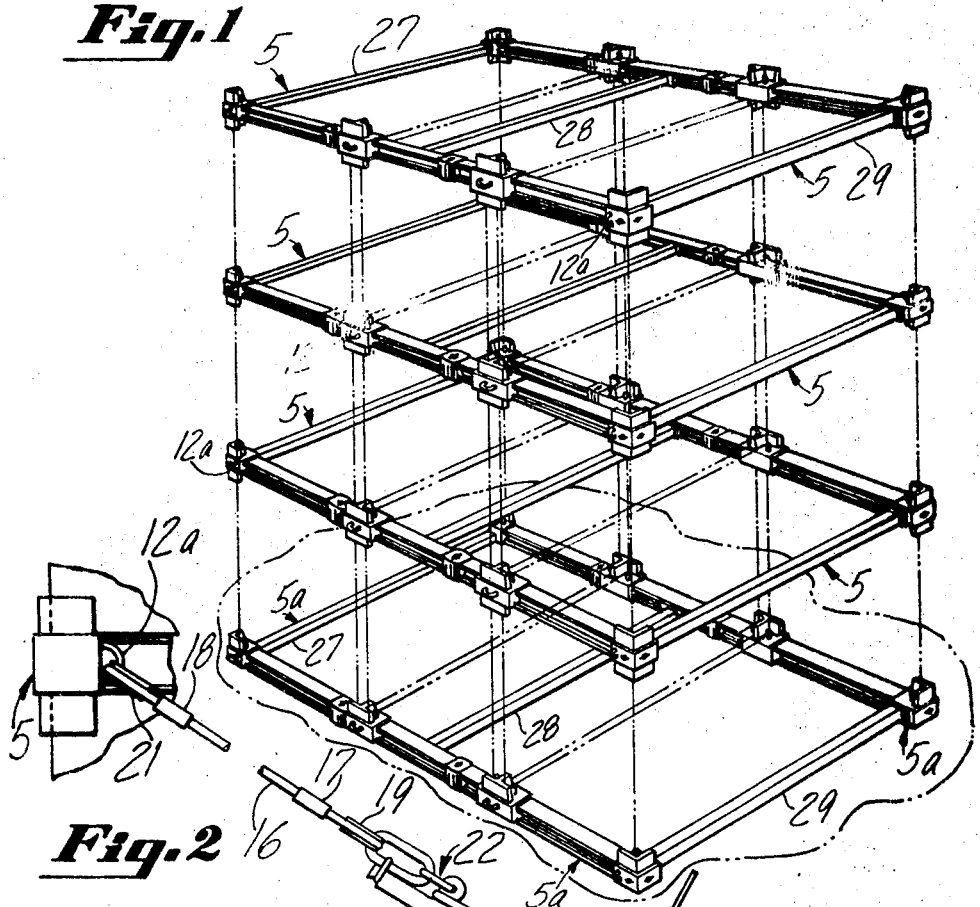
FIG. 1 is a perspective view of a plurality of stack-stabilizing racks depicted in a three-dimensional spatial arrangement such as would be established if the racks contained three tiers of containers.
FIG. 2 is a shortened elevation essentially of a "guy cable" as attached to a rack portion and a deck portion.
FIG. 3 is a fragmentary perspective enlarged view of portions of a rack as those shown in FIG. 1.

FIGS. 1 and 10 illustrate generally the manner in which the invention is used. FIG. 1 shows a plurality of racks 5, 5a in a disposition as established within a three-tier, twelve-container stack of cargo containers. The lowest rack 5a is utilized in the stack as a base for the lowest tier of containers of which illustration in full outline is omitted from FIG. 1 in order to effect fuller illustration of the racks. FIG. 10, however, includes the containers 6 and, in addition, corner staybars 7 and 7a, and guy cables 8 which secure the top rack 5a to a base, such as hatch cover 10. As all of the racks 7 or other means disclosed herein for tying the containers of each tier in a lengthwise direction comprise integral lashing staples 12, 12a, the racks capping the intervening tiers of containers, in addition to the top tier, are preferably secured by biased guy cables of which cables 8 are exemplary, to lashing pads 14 fixed to the hatch cover or other deck component. The term "guy cable" includes, as shown in FIG. 2, such basic components as a basic strand or wire rope 16, torpedo sleeves 17, 18, wire rope thimbles 19, 21, a pelican hook and link assembly 22, a ratchet turnbuckle 23, and a clevis type cable terminal 24 attached to the eye portion 25 of the deck pad 14.

For the purpose of permitting a more compact figure, FIG. 1 depicts the spacing arrangement of racks 5, 5a substantially as disposed when used for stacking standard 8' × 8' × 20' containers. Such racks are equally applicable to containers of another standard size, i.e., 8' × 8' × 40' by approximately doubling the length of the crosspieces 27, 28, 29. As shown, each rack is adapted to fit over the tops of the three containers in each tier wherein the containers are disposed in side-by-side relationship with the entire stack in boxlike configuration. The tops and bottoms of the containers of each tier occur in two substantially parallel horizontal planes and the ends of the containers of each tier, as well as those in the ends of the stack, are disposed in parallel vertical planes.

In noting an especially important feature of the invention, FIGS. 4 and 5 indicate that the rack 5 has projecting dowellike means, such as dowels 31 to 42, for entering the openings in the corner castings of all the containers embraced by the rack. As containers are now constructed to the American Standards Association standards, the openings in the corner castings are arranged in a standard pattern whether they be the top or the bottom corner castings of the container. The openings in the top corner castings of a container take the form and pattern of openings 43, 44, 45 and 46 of the rack 5. The horizontal pattern arrangement of openings in the bottom corner castings of each container is the same. Openings 43—46 are of elongate configuration to permit rotary latches of mating configuration carried by a container hoisting spreader to enter the openings 43—46 and be rotated to interlock with the walls defining these openings. Thus, the racks 5, 5a may be handled by the same equipment for individually handling the containers.

The racks 5, 5a comprise abutments or shoulder elements 47, 48 and the others shown which are tapered outwardly from seating surfaces for the containers, e.g., surfaces 51, 52, 53, 54. The shoulders typified by shoulders 47, 48 have the primary purpose of merely guiding a rack and a container into such registry that the dowels 31 to 42 will enter either the top or bottom openings of one tier of containers. As FIG. 7 illustrates, there are clearances between corner castings 56 and 57 and respective adjacent shoulder elements 58, 59. Any relative movement in the horizontal direction between a rack and the adjacent containers is stopped by dowels 51 and 51a. The dowels thus interlock the racks with the corner column structure of all corners of the containers in all horizontal directions in a way not possible through engagement of the shoulder elements with the outer surfaces of the corner castings.

The basic load-carrying capacity of a stack of containers may now be visualized as based essentially in a skeleton structure consisting of the racks 5, 5a and the four corner column assemblies of each container. One of such assemblies is shown in FIG. 6. In this FIG. is illustrated a vertical column component, such as an elongate length of steel angle 61, welded to corner castings 62, 63. The corner castings are horizontally interlocked with racks 5, 5a through respective dowels of the racks. The term "corner casting" embraces any mechanically equivalent receptacle of sufficient strength regardless of how made for the purpose of interlocking with container-lifting equipment, racks, 5, 5a, etc. With a load-supporting latticework established by the rack and column assemblies in this manner, a heavily loaded stack of containers may be effectively stabilized against any lateral forces acting on the stack by a system of guy cables such as illustrated in FIG. 10 especially if the racks at intermediate levels are also connected by guy cables (not shown) with a supporting base.

As also pointed out above, the stack may be laterally stabilized by guy cables connecting the base with the topmost rack if corner staybars 7, 7a preferably of angular or dihedral configuration are attached to corner portions of the racks at the four corners of the stack. Attachment may be effected as shown in FIGS. 8 and 9, which indicate that corner box elements 71 have elongate openings 72 adapted to receive elongate locking heads 73 of threaded pins 74 carried on the staybars 7, 7a. As shown in FIG. 8, such fastener may be carried by the stay bar at both sides of its cross-sectional apex. With the wheel nuts 75 turned to a loose position on the pin 74, the heads 73 thereof may be inserted in the openings 72 and rotated to a locking position. Tightening of the wheel nuts against the outer surface of the staybar secures the staybar tightly to the adjacent rack. With the racks 5 at the top of the stack and at various intermediate levels thereof secured to corner staybars at the four corners of the stacks, the containers are secured against any appreciable rocking motion within the stack.

It will be noted in FIG. 1 that a rack 5a is used at the bottom of the stack and in FIG. 10 at the top of the stack. Rack 5a is merely a less expensive type of rack constructed with dowels and guiding shoulder elements only on one side of the frame of the rack adapting it for use on the top or the bottom of the stack. Rack 5, on the other hand has dowels and shoulder elements extending in both perpendicular directions from the basic frame of the rack adapting it for use at intermediate levels in the stack or on the top or the bottom of the stack. FIG. 7 indicates that the dowels of a rack 5 are arranged in coaxial pairs, e.g., dowels 51, 51a have a common axis N–N. As a modification, the rack 5, as viewed in FIG. 4, may be constructed with detachable crosspieces 27, 28, 29 in order that the indentical beams 80 may be handled individually by cranes which are not adapted for lifting the complete rack into place. By proper disposition of guy cables, e.g., disposed in vertical planes nearly parallel to the crosspieces, it is possible to use the beams between and atop tiers of containers in the absence of the crosspieces. As shown, the beams 80 extend along dihedral portions of the containers formed at the junction of top or bottom walls with end or sidewalls.

FIGS. 10 and 11 illustrate platform or walk structure 82 bolted to the beams 80 of the racks in cantilever relation therewith at any desired level by devices (see element 74, 75) similar to those for securing the staybars 7, 7a to the racks. As there is increasing use of containers equipped with such auxiliary mechanisms, such as refrigerating equipment or air conditioning units, such walk structure is desirable for the day-to-day servicing and surveillance of such equipment. For safety, the platform structure 82 should include hand rail construction such as the posts 84 and the cable 85 shown secured to one corner of the stack. Shown in FIG. 10 is a modified corner staybar 7a which has L-shaped step elements 86. Thus, the staybar 7a functions admirably as a ladder means and where servicing of the stack during the voyage is required. Inclusion of the staybar 7a within the stack assembly is warranted on that basis alone.

As described above, the invention provides a system for stacking cargo containers wherein apparatus as disclosed herein and the containers are combined, interlocked and stabilized within a stack to eliminate any substantial horizontal or lateral forces acting on individual containers. The load-supporting structure of the stack resides essentially in the racks, the corner column structure of the containers, and the guy cables.

I claim:

1. In combination with a group of similar cargo containers and means supporting the containers in side-by-side boxlike configuration with their tops and bottoms in two substantially parallel horizontal planes, and the ends of containers which are exposed exteriorly of said group occurring in generally parallel vertical planes:

said containers each comprising a normally vertical column at each corner, and top and bottom corner castings secured to upper and lower ends, respectively, of the column, said castings having apertures opening in said tops and bottoms of the containers in identical horizontal patterns along said horizontal planes;

rigid beam means having dowellike projecting means arranged according to said patterns and of a shape and length adapting the beam means to extend along one of said horizontal planes over the entire group of containers in a direction perpendicularly to the planes of their sides with said projecting means extending into said apertures, said beam means extending in juxtaposed coextensive relation with dihedral portions of the containers occurring along the intersection of said horizontal plane with said vertical planes;

said beam means having upward-opening apertures spaced therealong, and when in operative position on said containers, said apertures being disposed in a pattern in agreement with the openings of one of said containers thereby adapting said beam means to be hoisted by equipment used in hoisting a container received by said beam means; and means for connecting said beam means in operative position over the tops of all containers in one tier of said group to said supporting means to secure the containers against lateral movement.

2. The combination of claim 1 comprising; means connecting spaced portions of said beam means in the horizontal end-to-end direction of the containers for relieving said containers of any internal end-to-end stresses.

3. The combination of claim 1 wherein; said projecting means are arranged to project upwardly and downwardly from said beam means in coaxial pairs.

4. The combination of claim 1 wherein; said beam means has container-seating surfaces in which said projecting means are based, and comprises shoulder means adjacent each projecting means tapering outwardly from the edges of the seating surfaces and outwardly relative to regions occupied by containers received by the beam means, said shoulder means functioning as guides for engaging a container to aline apertures thereof with said projecting means.

5. In combination with a plurality of similar cargo containers and means supporting the containers in side-by-side boxlike configuration with their tops and bottoms in two substantially parallel planes and opposite ends in approximately two other parallel planes:

said containers each comprising a normally vertical column at each corner, and top and bottom corner castings secured to the upper and lower ends, respectively, of said column, said castings having apertures opening in said tops and bottoms of said containers in two identical horizontal patterns;

a rack having its peripheral portions alined within a plane, said portions extending over the horizontal periphery and a margin inwardly therealong of said plurality of containers, said rack portions having dowellike projecting means extending perpendicularly relative to said rack plane in matching relation with the openings of either of said patterns with said projecting means disposed in the openings of one of said patterns;

means for connecting said rack in operative position over the tops of said containers to said supporting means for securing the containers against lateral movement; and said rack having upward-opening apertures similar to said container openings spaced along its said plane in conformity with the openings of one of said containers in one of said parallel planes.

6. In combination with similar cargo containers stacked in tiers and means supporting the containers in side-by-side, boxlike configuration with the tops and bottoms of each tier of containers in two substantially parallel horizontal planes, the opposite ends of all of the containers being approximately disposed in two vertical parallel planes;

said containers each comprising a normally vertical column at each corner, and top and bottom corner castings secured to the upper and lower ends, respectively of said column;

said castings having apertures opening in said tops and bottoms of said containers, said top openings in a tier of said containers being arranged in a horizontal pattern identical with that of the bottom openings of said tier and the top and bottom openings of any other of said tiers;

a rack having its peripheral portions alined within a plane, said portions conforming to the horizontal periphery and a margin inwardly therealong of said plurality of containers, said rack portions having dowels extending perpendicularly relative to said rack plane into the top openings of the top tier of containers;

at least another generally planate rack normally received between adjacent tiers of said containers, and having pairs of coaxial dowels disposed in said horizontal pattern extending upwardly and downwardly from the general plane of the rack, said upward extending dowels being received into bottom openings of the adjacent upper tier and said downward extending dowels being received in the openings of the tier below the rack; and means for connecting said racks to said supporting means to secure the racks and containers against lateral movement, each of said racks having upward-opening apertures similar to said container openings spaced along its general plane in conformity with the spacing of openings in one of said containers along a horizontal plane.

7. The combination of claim 6 comprising:

at least one detachable corner stay member extending vertically along one corner of the stack in substantial contact with corner portions of all racks in the stack; and means for detachably fastening the stay member to said rack corner portions.

8. The combination of claim 6 comprising:

detachable corner stay members extending vertically along corner portions of the stack in substantial contact with corner portions of racks in respective corner portions of the stack;

means for detachably fastening the stay members to said rack corner portions; and guy cables connecting the top rack to said supporting means to secure the stack against horizontal movement.

9. The combination of claim 6 comprising:

a detachable corner stay member extending vertically along a corner portion of the stack in substantial contact with adjacent corner portions of the racks;

means for detachably securing the stay member to said rack corner portions; and said stay member comprising step means extending outwardly of an outward-facing surface thereof.

10. The combination of claim 6 comprising:

detachable platform and walk means adapted to extend along a region outwardly of the stack adjacent a rack; and means for detachably securing said platform and walk means to said rack in cantilever relation therewith.

11. The combination of claim 10 wherein:

said platform and walk means extend into adjacent relation with a corner portion of the stack; and a corner stay member extending vertically along said corner portion of the stack, means for detachably securing the stay member to the said racks, said stay member comprising step means disposed along the length of the stay member into adjacent relation with each rack.

12. The combination of claim 7 wherein; said staybar member is of dihedral configuration adapting it to fit around the said corner of the stack, and said fastening means connect the stay member with said racks along both sides of the said corner of the stack.

13. A rigid rack for use in stacking uniformly-sized containers in tiers wherein a plurality of containers disposed in side-by-side boxlike configuration comprising peripheral portions alined within a plane, said rack portions conforming to a configuration embracing a tier of the containers and adapting the rack to be supported over or underneath the tier of said containers:

said portions having short dowels fixed thereto extending perpendicularly to the principal plane of the rack and disposed in a standard horizontal pattern for entering openings in the top and the bottom corners of the containers;

means for connecting said rack, when operatively engaged with a matching plurality of containers, to a supporting means for said containers; and portions of said rack having upward-opening apertures spaced along said plane in conformity with the pattern of spacing a set of dowels on said rack which enter a single container, adapting the rack to be hoisted by equipment used in hoisting a container received by said rack.

14. In combination with similar cargo containers stacked in tiers and means supporting the containers in side-by-side, boxlike configuration with the tops and bottoms of each tier of containers in two substantially parallel horizontal planes, the opposite ends of all of the containers being approximately disposed in two vertical parallel planes:

said containers each comprising a normally vertical column at each corner, and top and bottom corner castings secured to the upper and lower ends, respectively, of said column;

said castings having apertures opening in said tops and bottoms of said containers, said top openings in a tier of said containers being arranged in a horizontal pattern identical with that of the bottom openings of said tier and the top and bottom openings of any other of said tiers;

a rack having its peripheral portions alined within a plane, said portions conforming to the horizontal periphery and a margin inwardly therealong of said plurality of containers, said rack portions having dowels extending perpendicularly relative to said rack plane into the top openings of the top tier of containers;

at least another generally planate rack normally received between adjacent tiers of said containers, and having pairs of coaxial dowels disposed in said horizontal pattern extending upwardly and downwardly from the general plane of the rack, said upward extending dowels being received into bottom openings of the adjacent upper tier and said downward extending dowels being received in the openings of the tier below the rack;

means for connecting said racks to said supporting means to secure the racks and containers against lateral movement;

at least one detachable corner stay member extending vertically along one corner of the stack in substantial contact with corner portions of all racks in the stack; and means for detachably fastening the stay member to said rack corner portions.